US012243422B2

(12) United States Patent
Qi et al.

(10) Patent No.: US 12,243,422 B2
(45) Date of Patent: Mar. 4, 2025

(54) HIERARCHICAL TRANSFER LEARNING SYSTEM

(71) Applicant: Toyota Motor Engineering & Manufacturing North America, Inc., Plano, TX (US)

(72) Inventors: Xuewei Qi, Mountain View, CA (US); Kentaro Oguchi, Mountain View, CA (US); Yongkang Liu, Mountain View, CA (US); Emrah Akin Sisbot, Menlo Park, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 373 days.

(21) Appl. No.: 17/681,092

(22) Filed: Feb. 25, 2022

(65) Prior Publication Data
US 2023/0274641 A1    Aug. 31, 2023

(51) Int. Cl.
*G08G 1/0967* (2006.01)
*G08G 1/01* (2006.01)

(52) U.S. Cl.
CPC ..... *G08G 1/096775* (2013.01); *G08G 1/0129* (2013.01)

(58) Field of Classification Search
CPC .......... G08G 1/096775; G08G 1/0129
See application file for complete search history.

(56) References Cited

U.S. PATENT DOCUMENTS

| 11,636,348 B1* | 4/2023 | Tang | G06N 7/01 706/16 |
| 2018/0190111 A1* | 7/2018 | Green | G08G 1/0133 |
| 2019/0354838 A1* | 11/2019 | Zhang | G07C 5/085 |
| 2021/0287080 A1* | 9/2021 | Moloney | G06V 10/82 |

OTHER PUBLICATIONS

Hosseinalipour, S. et al., "From Federated Learning to Fog Learning: Towards Large-Scale Distributed Machine Learning in Heterogeneous Wireless Networks", 2020, Retrieved from https://www.arxiv-vanity.com/papers/2006.03594/, in 21 pages.
Saha, R. et al., "FogFL: Fog Assisted Federated Learning for Resource-Constrained IoT Devices", Dec. 22, 2020, in 8 pages.
Barik, R. et al., "FogLearn: Leveraging Fog-based Machine Learning for Smart System Big Data Analytics", 2018, in 16 pages.
(Continued)

*Primary Examiner* — James J Lee
*Assistant Examiner* — Steven Vu Nguyen
(74) *Attorney, Agent, or Firm* — Christopher G. Darrow; Darrow Mustafa PC (57) ABSTRACT

Systems, methods, and other embodiments described herein relate to improving the performance of a device in different geographic locations by using transfer learning to provide a customized learning model for the different locations. In one embodiment, a method includes receiving segments of a model from separate members in a geographic hierarchy and assembling the segments into the model. The segments include at least a first segment, a second segment, and a third segment. The method includes processing sensor data using the model to provide an output for assisting a device.

15 Claims, 5 Drawing Sheets

(56) References Cited

OTHER PUBLICATIONS

Kairouz, P. et al., "Advances and Open Problems in Federated Learning", found at: arXiv: 1912.04977v3 [cs.LG] Mar. 9, 2021, in 121 pages.
Rasku, J. et al., "Automatic Customization Framework for Efficient Vehicle Routing System Deployment", Computational Methods and Models for Transport (2018), in 17 pages.
Zhuang, F. et al., "A Comprehensive Survey on Transfer Learning", found at: arXiv:1911.02685v3 [cs.LG] Jun. 23, 2020, in 31 pages.

\* cited by examiner

HIERARCHICAL TRANSFER LEARNING SYSTEM

TECHNICAL FIELD

The subject matter described herein relates, in general, to systems and methods for achieving transfer learning between devices in different geographical locations.

BACKGROUND

Modern vehicles include various degrees of advanced driver-assistance systems (ADAS). Such systems may make situational decisions. The accuracy of these situational decisions is largely dependent on the quality of the training of the systems, which may result from the amount and type of data the systems use to train.

In addition to systems improving the accuracy of decision-making by training on large amounts of data, the systems can further improve the quality of the decision-making by training on data with certain characteristics such as data from a particular geographical area in which the system is operating.

However, relying on training data from a particular geographic area can make a model overly specific to the particular geographic area and thus render the model less effective in other areas. As such, a significant complexity arises in relation to creating a model that is adaptable to different geographic areas without implementing significant changes, in place of individually training a different model for each different geographical area.

SUMMARY

In one embodiment, example systems and methods relate to improving the performance of a device in different geographic locations by using transfer learning to provide a customized learning model for the different locations. Generally, transfer learning permits a system that has been trained to solve a first problem (e.g., identification of a first ontology in a first area) to apply the training, at least in part, to a second problem (e.g., identification of a second ontology in a second area) that is different from but related to the first problem.

In one arrangement, a system trains a model on a dataset so that the model can perform decision making in relation to a subject of the dataset. The quality of the training can depend, at least in part, on the quality of and the amount of data in the dataset. The system can improve performance in relation to local issues by training the model on local datasets that are related to the locality of the device. Additionally, the system can improve performance by training on global region datasets, in addition to local region datasets. In such a case, the system is not limited to training on local data and can train on a larger amount of data of the global region datasets. As such, the model can learn from other geographical regions.

Therefore, in one or more embodiments, an inventive system is disclosed that achieves transfer learning across different geographical regions and generates customized deployments of machine learning models. The system permits cross-region knowledge transfer, where learned knowledge is aggregated and transferred between different geographical regions. In other words and as previously mentioned, in addition to devices learning from models trained on data within the same local region, devices can learn from models trained on data from different geographical regions.

In one arrangement, the system receives segments of a model from separate members in a geographic hierarchy. As an example, the geographic hierarchy can include multiple members. In such an example, the geographic hierarchy can include, as members, a city manager server, locality manager servers, and section manager servers (collectively known as the servers). As an example, the city manager server can be at the top of the geographic hierarchy and can communicate with the system, the device as well as one or more additional devices when the device and the additional devices are located within a region such as a city, which is defined by a city boundary. The city manager server can receive weights from the device and the devices located within the region. The weights can be related to data that is shared amongst devices located across the region. As an example, the weights can be related to traffic rules that are common across the region (e.g., the city). As another example, the weights can be related to weather conditions that are common across the region. The city manager server can be connected to the locality manager servers. As an example, the locality manager server is in the middle of the geographic hierarchy and the section manager server is at the bottom of the geographic hierarchy. The locality manager server can communicate with devices located within a sub-region of the city such as a neighborhood that is limited by a neighborhood boundary, and the section manager server can communicate with devices located within a sub-region of a neighborhood such as a street that is limited by a street boundary. Similar to the description for the city manager server above, the locality manager servers and the section manager server can receive weights from the device and the devices located within the respective sub-regions. The weights can be related to data that is shared amongst devices located across the sub-regions. As an example, the weights received by the locality manager servers can be related to the terrain that is common across the sub-region (e.g., the neighborhood). As another example, the weights received by the section manager server can be related to traffic levels that are common across the sub-region (e.g., the street).

In one arrangement and as an example, devices within the city train on available data and generate a set of trained weights for the segments of the model. As an example, the model may include three segments—a first segment can be a city level segment, a second segment can be a neighborhood level segment, and a third segment can be street level segment. The devices may generate a first set of trained weights for the city level segment, a second set of trained weights for the neighborhood level segment, and a third set of trained weights for the street level segment.

In such an arrangement, the city manager server receives the first set of trained weights from devices located within the city, and the city manager server aggregates the first set of trained weights to form a first segment and transmits the first segment to the locality manager server.

The locality manager server receives the first segment from the city manager server. The locality manager server receives the second set of trained weights from devices located within the neighborhood, and the locality manager server aggregates the second set of trained weights to form a second segment and transmits the first segment and the second segment to the section manager server.

The section manager server receives the first segment and the second segment from the locality manager server. The section manager server receives the third set of trained weights from devices located along the street, and the section manager server aggregates the third set of trained weights to form a third segment. The section manager server transmits the first segment, the second segment, and the third segment to the system.

In one or more arrangements, the system receives the segments from the section manager server. The system assembles the segments into the model. The system receives sensor data from sensors and processes the sensor data using the model to generate an output. The system can transmit this output to the device. Additionally, the system can transmit the model to the device and/or other devices. As such, the device as well as the other devices can train using the model and learn from data based on the local region and global regions. Therefore, the presently discussed embodiments improve operation of machine learning algorithms within local geographic environments by providing trained weights related to data from diverse geographic environments. The data includes data with characteristics that are specific to the local environment as well as data with characteristics that are common between the local environment and other environments. The machine learning algorithms may be more accurate as the algorithms are based not only on data from the local environment but also on data shared from other environments including a larger, more encompassing environment.

In one embodiment, a system is disclosed. The system includes one or more processors and a memory communicably coupled to the one or more processors. The memory stores a control module including instructions that, when executed by the one or more processors, cause the one or more processors to receive segments of a model from separate members in a geographic hierarchy, assemble the segments into the model, and process sensor data using the model to provide an output for assisting a device. The segments include at least a first segment, a second segment, and a third segment.

In one embodiment, a method is disclosed. The method includes receiving segments of a model from separate members in a geographic hierarchy and assembling the segments into the model. The segments include at least a first segment, a second segment, and a third segment. The method includes processing sensor data using the model to provide an output for assisting a device.

In one embodiment, a non-transitory computer-readable medium including instructions that, when executed by one or more processors, cause the one or more processors to perform various functions is disclosed. The instructions include instructions to receive segments of a model from separate members in a geographic hierarchy, assemble the segments into the model, and process sensor data using the model to provide an output for assisting a device. The segments include at least a first segment, a second segment, and a third segment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the performance of a device in different geographic locations by using transfer learning to provide a customized learning model for the different locations are disclosed. Generally, transfer learning permits a system that has been trained to solve a first problem (e.g., identification of a first ontology in a first area) to apply the training, at least in part, to a second problem (e.g., identification of a second ontology in a second area) that is different from but related to the first problem.

Some approaches may include a centralized model that distributes learning data to the device(s) in an indiscriminate manner without considering the location of the device(s). In such a model, the device is not able to improve problem solving skills relating to the region in which the device is located. Another previously disclosed system is a node-end model that distributes learning data between device(s) that are local to each other and are connected to a single point of contact such as a local edge device. The node-end model limits the learning data provided for the device to train on to learning data within the local region and so, the device is unable to benefit from and learn using learning data from other geographical regions.

In one arrangement, a system functions to train a model on a dataset so that the model can perform decision making in relation to a subject of the dataset. The quality of the training can depend, at least in part, on the quality of and the amount of data in the dataset. The system can improve performance in relation to local issues by training the model on local datasets that are related to the locality of the device. Additionally, the system can improve performance by training on global region datasets, in addition to local region datasets. In such a case, the system is not limited to training on local data and can train on a larger amount of data of the global region datasets. As such, the model can learn from other geographical regions.

Therefore, in one or more embodiments, an inventive system is disclosed that achieves transfer learning across different geographical regions and generates customized deployments of machine learning models. The system permits cross-region knowledge transfer, where learned knowledge is aggregated and transferred between different geographical regions. In other words and as previously mentioned, in addition to devices learning from models trained on data within the same local region, devices can learn from models trained on data from different geographical regions.

In one arrangement, the system receives segments of a model from separate members in a geographic hierarchy. As an example, the geographic hierarchy can include multiple members. In such an example, the geographic hierarchy can include, as members, a city manager server, locality manager servers, and section manager servers (collectively known as the servers). As an example, the city manager server can be at the top of the geographic hierarchy and can communicate with the system, the device as well as one or more devices when the device and the devices are located within a region such as a city, which is limited by a city boundary. The city manager server can receive weights from the device and the devices located within the region. The weights can be related to data that is shared amongst devices located across the region. As an example, the weights can be related to traffic rules that are common across the region (e.g., the city). As another example, the weights can be related to weather conditions that are common across the region. The city manager server can be connected to the locality manager servers. As an example, the locality manager server is in the middle of the geographic hierarchy and the section manager server is at the bottom of the geographic hierarchy. The locality manager server can communicate with devices located within a sub-region of the city such as a neighborhood that is limited by a neighborhood boundary, and the section manager server can communicate with devices located within a sub-region of a neighborhood such as a street that is limited by a street boundary. Similar to the description for the city manager server above, the locality manager servers and the section manager server can receive weights from the device and the devices located within the respective sub-regions. The weights can be related to data that is shared amongst devices located across the sub-regions. As an example, the weights received by the locality manager servers can be related to the terrain that is common across the sub-region (e.g., the neighborhood). As another example, the weights received by the section manager server can be related to traffic levels that are common across the sub-region (e.g., the street).

In one arrangement and as an example, devices within the city train on available data and generate a set of trained weights for the segments of the model. As an example, the model may include three segments-a first segment can be a city level segment, a second segment can be a neighborhood level segment, and a third segment can be street level segment. The devices may generate a first set of trained weights for the city level segment, a second set of trained weights for the neighborhood level segment, and a third set of trained weights for the street level segment.

In such an arrangement, the city manager server receives the first set of trained weights from devices located within the city, and the city manager server aggregates the first set of trained weights to form a first segment and transmits the first segment to the locality manager server. The city manager server may transmit the first segment to the locality manager server while employing a deep neural network segmentation freezing. In such a case, the data and/or weights related to the locality manager server (i.e., the second segment) are frozen and are unchanged as the city manager server transmits the first segment to the locality manager server. This may be the case for the section manager server as well, as the locality manager server transmits the first and second segments to the section manager server.

The locality manager server receives the first segment from the city manager server. The locality manager server receives the second set of trained weights from devices located within the neighborhood, and the locality manager server aggregates the second set of trained weights to form a second segment and transmits the first segment and the second segment to the section manager server.

The section manager server receives the first segment and the second segment from the locality manager server. The section manager server receives the third set of trained weights from devices located along the street, and the section manager server aggregates the third set of trained weights to form a third segment. The section manager server transmits the first segment, the second segment, and the third segment to the system.

In one or more arrangements, the system receives the segments from the section manager server. The system assembles the segments into the model. The segments of the model are described in FIG. 2 below. The system receives sensor data from sensors and processes the sensor data using the model to generate an output. The system can transmit this output to the device. Additionally, the system can transmit the model to the device and/or other devices. As such, the device as well as the other devices can train using the model and learn from data based on the local region and global regions. Therefore, the presently discussed embodiments improve operation of machine learning algorithms within local geographic environments by providing trained weights related to a larger set of data from diverse geographic environments. The data includes data with characteristics that are specific to the local environment as well as data with characteristics that are common between the local environment and other environments. The machine learning algorithms may be more accurate as the algorithms are based not only on data from the local environment but also on data shared from other environments including a larger, more encompassing environment. Further, multiple devices can be trained in parallel with customized data.

Figure 1:
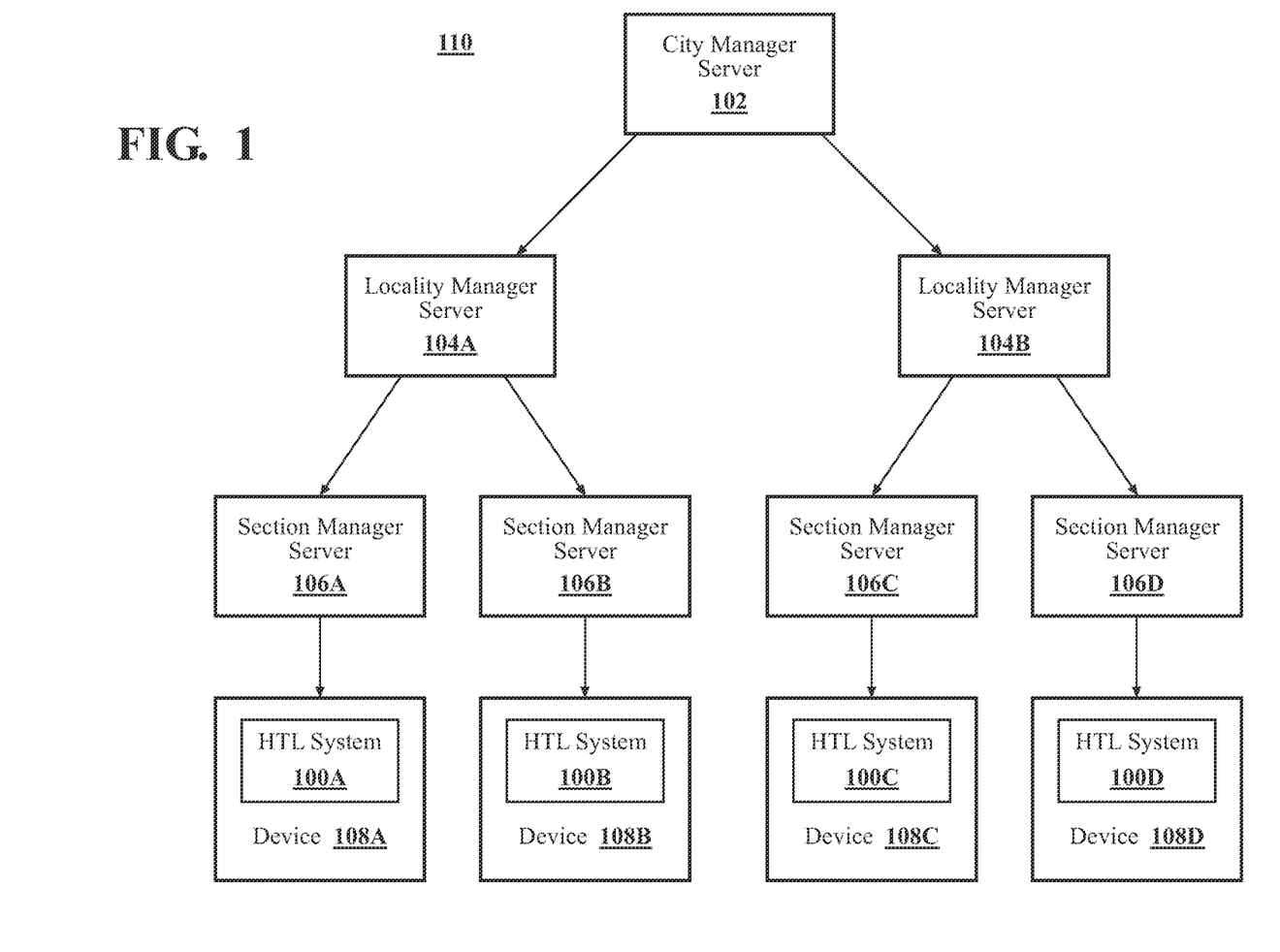
FIG. 1 illustrates an example of a geographic hierarchy that includes a Hierarchical Transfer Learning (HTL) system.

Referring to FIG. 1, an example of a geographic hierarchy 110 that includes a hierarchical transfer learning (HTL) system 100 is illustrated. The geographic hierarchy 110 also includes various elements. It will be understood that, in various embodiments, it may not be necessary for the geographic hierarchy 110 to have all of the elements shown in FIG. 1. Further, the geographic hierarchy 110 can have additional elements to those shown in FIG. 1.

As illustrated in the embodiment of FIG. 1 and as an example, the geographic hierarchy 110 can communicate with one or more devices. As an example, the devices can include a mobile device (e.g., a vehicle), and/or a stationary device (e.g., an edge device). The device can train on available data and generate a set of trained weights for one or more layers of a model. As an example, the model may include three layers—a city level layer, a neighborhood level layer, and a street level layer. The device may generate a first set of trained weights for the city level layer, a second set of trained weights for the neighborhood level layer, and a third set of trained weights for the street level layer.

The geographic hierarchy 110 can include separate members at different levels of the hierarchy. The range that the members cover, the number of devices the members communicate with, and the layers that the members receive weights for can vary based on, as an example, the level of the members in the hierarchy. As shown, the geographic hierarchy 110 may cover a city that includes two neighborhoods, and each of the neighborhoods includes two streets. The geographic hierarchy 110 includes, at the top level, one city manager server 102 with a range that covers the city. The city manager server 102 communicates with devices located within a first region such as a city. The city manager server 102 receives trained weights from the devices within the first region. As an example, the city manager server 102 can receive trained weights for the city level layer of the model from the devices.

The geographic hierarchy 110 includes, at the middle level, two locality manager servers 104A, 104B (collectively known as 104)—each one having a range that can cover one of the two neighborhoods. In general, the locality manager servers 104 can communicate with devices located within a second region that is a portion of the first region. The second region is smaller than the first region and can be, as an example, a neighborhood. The locality manager servers 104 can receive trained weights from the devices within the second region. As an example, the locality manager servers 104 can receive trained weights for the neighborhood level layer of the model from the devices.

The geographic hierarchy 110 includes, at the bottom level, four section manager servers 106A, 106B, 106C, 106D (collectively known as 106)—each one having a range that can cover one of the four streets. In general, the section manager servers 106 can communicate with devices located within a third region that is a portion of the second region. The third region is smaller than the second region and can be, as an example, a street. The section manager servers 106 can receive trained weights from the devices within the third region. As an example, the section manager servers 106 can receive trained weights for the street level layer of the model from the devices.

The city manager server 102, the locality manager servers 104, and the section manager servers 106 (collectively known as the servers) can aggregate the trained weights from the devices. Upon receiving the trained weights from the devices, the servers 102, 104, 106 can apply any suitable aggregate function (e.g., mean, average, and/or mode) to the trained weights to generate an aggregate of the trained weights and the servers 102, 104, 106 can reformat the aggregate into a layer of the model. The city manager server 102 aggregates the trained weights for the city level layer of the model from the devices into a first segment of a model. The city manager server 102 then transmits the first segment of the model to the locality manager servers 104. The locality manager servers 104 aggregate the trained weights for the neighborhood level layer of the model from the devices into a second segment of the model. The locality manager servers 104 then transmit the first segment and the second segment of the model to the section manager servers 106. The section manager servers 106 aggregate the trained weights for the street level layer of the model from the devices into a third segment of the model. The section manager servers 106 transmit the first segment, the second segment, and the third segment of the model to the HTL system 100. The section manager servers 106 may transmit the segments to the HTL system 100 in response to receiving a request to transmit the segments to the HTL system 100.

Upon receiving the segments of the model, the HTL system 100 processes the weights in the segments of the model to generate an electronic output. As an example, the HTL system 100 can apply a linear regression algorithm to the trained weights to produce an electronic output that comprises of a vector of coefficients. As another example, the HTL system 100 can apply a decision tree algorithm to the trained weights to produce an electronic output that comprises of a tree of if-then statements. As another example, the HTL system 100 can apply a neural network, back propagation, and gradient descent algorithms to the trained weights to produce an electronic output that comprises a graph structure with vectors or matrices of weights. The geographic hierarchy 110 is scalable and can include more than three levels as shown in FIG. 1, with multiple levels of servers being located in the middle of the geographic hierarchy 110. As such, the number of levels and the number of servers at the levels can be increased or reduced in relation to, as an example, the region being covered by the geographic hierarchy 110 and/or the capacity or range of the servers in the geographic hierarchy 110.

Figure 2:
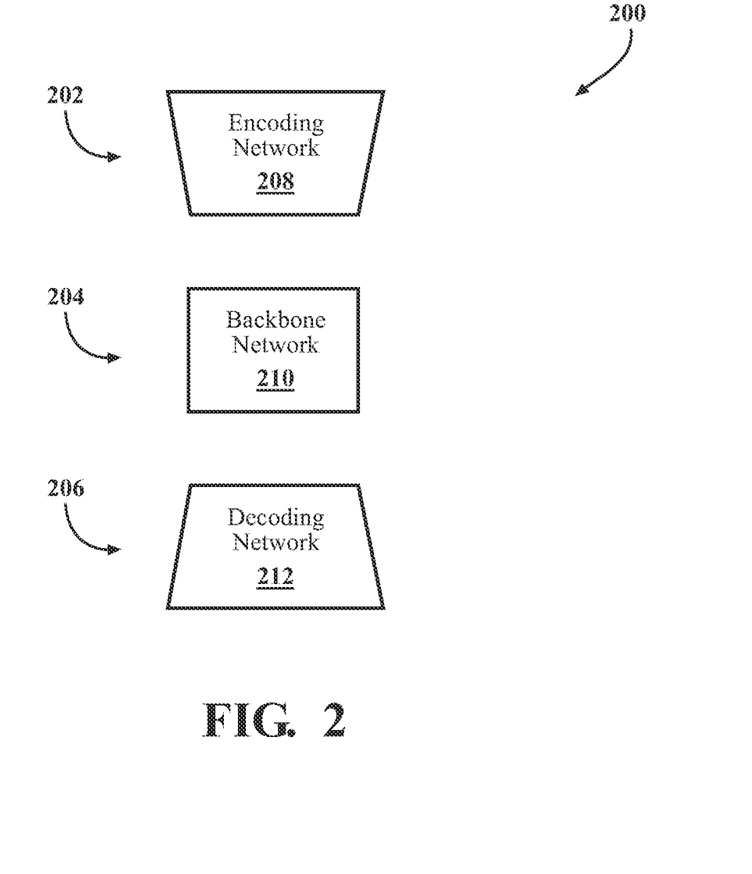
FIG. 2 illustrates one embodiment of a model.

Referring to FIG. 2, an embodiment of a model 200 is illustrated. The model 200 can include one or more segments. As shown, the model 200 includes a first segment 202, a second segment 204, and a third segment 206. Each of the segments 202, 204, 206 can include one or more layers. As an example, the first segment 202 of the model 200 can include early layers, the second segment 204 of the model 200, and the third segment 206 of the model 200. Typically, the early layers make up an encoding network 208 (e.g., convolutional encoder) and are responsible for encoding features that represent raw information input from a dataset. The middle layers make up a backbone network 210 (e.g., feature extraction network, dense neural network (DNN)) and can learn hidden states and physical meanings for the encoded features. The backbone network 210 can comprise of multiple sub-networks. The late layers make up a decoding network 212 (e.g., convolutional neural network (CNN) decoder) and can learn mapping between the learned hidden states and a final output (e.g., predictions, classifications, and decisions). As an example, the final output can be an image recognition model, a vehicle navigation model, or a vehicle trajectory prediction module. For a vehicle trajectory prediction model as an example, the early layers can be used for learning common traffic rules within a city, the middle layers can be used for learning area specific trends such as a style of driving based on weather conditions in a neighborhood, and the late layers can be used for learning local behaviors such as an acceptable speed of travel on a particular street.

The HTL system 100 assembles the segments 202, 204, 206 received from the servers 102, 104, 106. More specifically, the HTL system 100 assembles the first segment 202 as the early layers of the encoding network 208, the second segment 204 as the middle layers of the backbone network 210, and the third segment 206 as the late layers of the decoding network 212. The HTL system 100 then provides the model 200 to the device 108 such that the device 108 can use the model 200 to learn and predict an outcome. The different layers are trained with different scales of data and learn different semantic meanings. As such, the earlier layers of the encoding network 208 include more abstract knowledge (feature encoding) and the late layers in the decoding network 212 include more specific physical knowledge (regressing). Abstract knowledge such as feature encoding can be used by different tasks that learned from a similar dataset while more specific knowledge is geared towards local or targeted tasks.

As an example, the early layers in the encoding network 208 can result in learning common traffic rules which can be utilized by devices 108 such as at multiple locations. The middle layers in the backbone network 210 can include learning area specific trends, which may refer to traffic styles specific to a location such as a specific neighborhood. The later layers in the decoding network 212 can include learning local behaviors, which may refer to traffic styles specific to a location such as a specific street.

Figure 3:
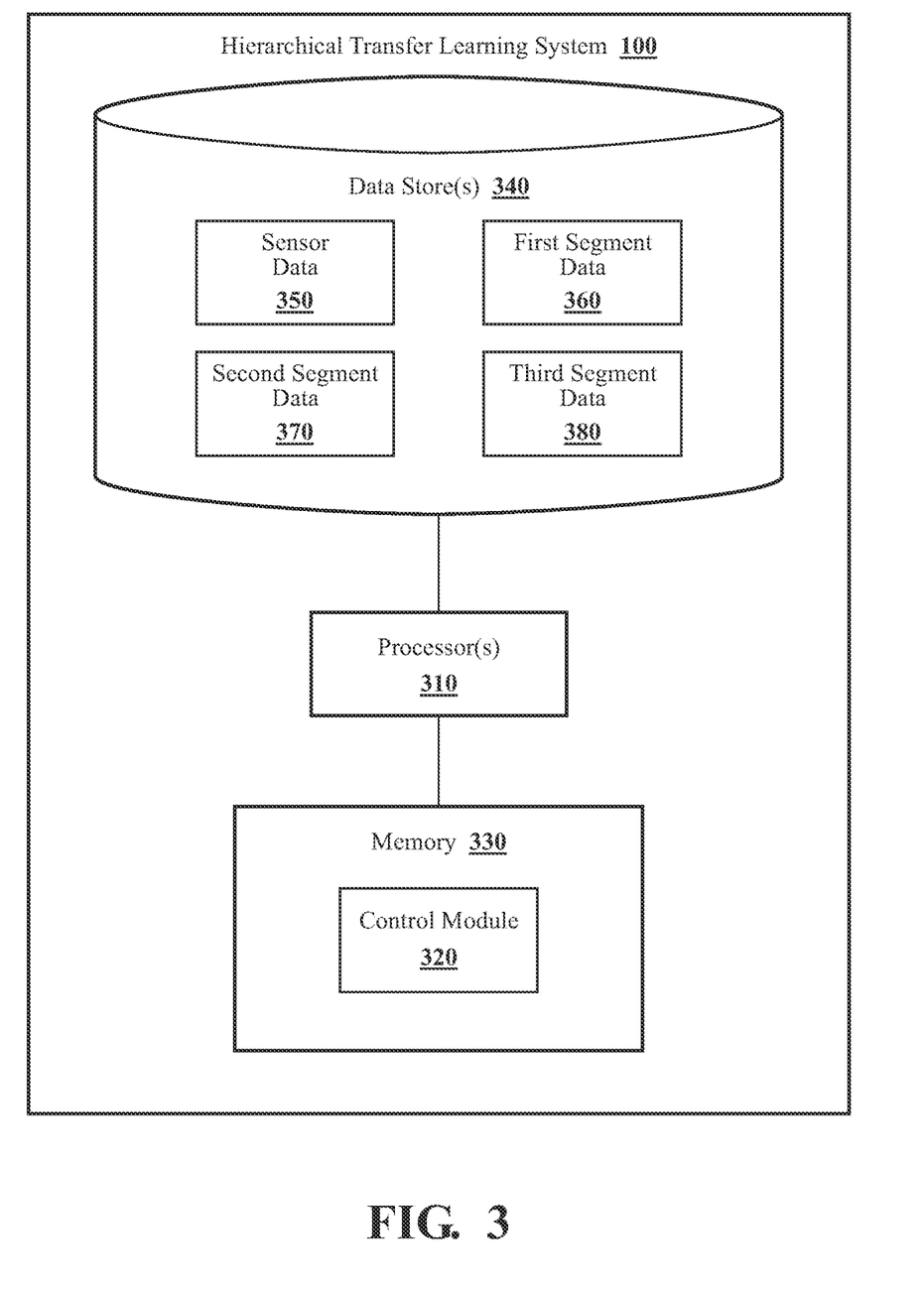
FIG. 3 illustrates one embodiment of the HTL system.

With reference to FIG. 3, one embodiment of the HTL system 100 is further illustrated. The HTL system 100 is shown as including a processor 310. Accordingly, the processor 310 may be a part of the HTL system 100, or the HTL system 100 may access the processor 310 through a data bus or another communication path. In one or more embodiments, the processor 310 is an application-specific integrated circuit (ASIC) that is configured to implement functions associated with a control module 320. In general, the processor 310 is an electronic processor, such as a microprocessor, that is capable of performing various functions as described herein.

In one embodiment, the HTL system 100 includes a memory 330 that stores the control module 320 and/or other modules that may function in support of hierarchical transfer learning. The memory 330 is a random-access memory (RAM), read-only memory (ROM), a hard disk drive, a flash memory, or another suitable memory for storing the control module 320. The control module 320 is, for example, computer-readable instructions that, when executed by the processor 310, cause the processor 310 to perform the various functions disclosed herein. In further arrangements, the control module 320 is a logic, integrated circuit, or another device for performing the noted functions that includes the instructions integrated therein.

Furthermore, in one embodiment, the HTL system 100 includes a data store 340. The data store 340 is, in one arrangement, an electronic data structure stored in the memory 330 or another data store, and that is configured with routines that can be executed by the processor 310 for analyzing stored data, providing stored data, organizing stored data, and so on. Thus, in one embodiment, the data store 340 stores data used by the control module 320 in executing various functions. For example, as depicted in FIG. 3, the data store 340 includes sensor data 350, first segment data 360, second segment data 370, and third segment data 380, along with, for example, other information that is used and/or produced by the control module 320. The sensor data 350 can originate from a mobile device (e.g., a vehicle) and/or a stationary device (e.g., roadside equipment). The sensor data 350 can include data from other suitable sensors that the HTL system 100 is in communication with. The first segment data 360 includes information about the weights received by the HTL system 100 from the top-level server 102, the second segment data 370 includes information about the weights received by the HTL system 100 from the middle level server 104, and the third segment data 380 received by the HTL system 100 from the bottom level server 106.

In various approaches, the sensor data 350 includes information relating to the environment such as road conditions, weather conditions, and traffic levels. Sensor data 350 may include information about any proximate devices such as the condition of the proximate devices.

While the HTL system 100 is illustrated as including the various data elements, it should be appreciated that one or more of the illustrated data elements may not be included within the data store 340 in various implementations and may be included in a data store that is external to the HTL system 100. In any case, the HTL system 100 stores various data elements in the data store 340 to support functions of the control module 320.

In one embodiment, the control module 320 includes instructions that, when executed by the processor(s) 310, cause the processor(s) 310 to receive segments 202, 204, 206 of the model 200 from separate members 102, 104, 106 in the geographic hierarchy 110. As an example and as previously described, the geographic hierarchy 110 can include multiple levels, and the separate members 102, 104, 106 in the geographic hierarchy can be separate servers on separate levels of the geographic hierarchy 110.

In one or more arrangements, the control module 320 includes instructions that, when executed by the processor(s) 310, cause the processor(s) 310 to determine a current location of the device 108, and select the separate members 102, 104, 106 based at least on the current location of the device 108. As an example, the control module 320 requests the location of the device 108 from the device 108. Upon receiving the location of a device 108, the control module 320 identifies the servers 102, 104, 106 at the separate levels closest to the device 108. The control module 320 identifies the servers 102, 104, 106 closest to the device 108 by requesting the location of the servers 102, 104, 106 within communication range and comparing the distance between the location of the responding servers 102, 104, 106 and the location of the device 108. The control module 320 then requests one or more segments 202, 204, 206 of the model 200 from the closest identified servers 102, 104, 106. The control module 320 requests segments from the servers 102, 104, 106 at the various levels of the geographic hierarchy 110. As an example, the control module 320 requests a first segment 202 of the model 200 from the top-level server (e.g., the city manager server 102), a second segment 204 of the model 200 from the middle level server (e.g., locality manager server 104), and a third segment 206 of the model 200 from the bottom level server (e.g., section manager server 106). In response to requesting the first, second, and third segments 202, 204, 206 of the model 200, the control module 320 receives the segments 202, 204, 206 of the model 200 from the top-level server, the middle level server(s), and the bottom level server. As an example, the control module 320 stores information relating to the first segment 202 in the first segment data 360, information relating to the second segment 204 in the second segment data 370, and information relating to the third segment 206 in the third segment data 380.

In one embodiment, the control module 320 includes instructions that, when executed by the processor(s) 310, cause the processor(s) 310 to assemble the segments 202, 204, 206 into the model 200. The segments 202, 204, 206 can include at least a first segment 202, a second segment 204, and a third segment 206. As previously mentioned and as an example, the first segment 202 of the model 200 can include early layers that make up the encoding network 208, the second segment 204 of the model 200 can include middle layers that make up the backbone network 210, and the third segment 206 of the model 200 can include the late layers that make up the decoding network 212. The control module 320 can assemble the segments 202, 204, 206 into the model 200 by layering the first, second, and third segments 202, 204, 206.

In one embodiment, the control module 320 includes instructions that, when executed by the processor(s) 310, cause the processor(s) 310 to process sensor data 350 using the model 200 to provide an output for assisting a device 108. As an example, the control module 320 can receive sensor data 350 from the device 108, process the sensor data 350 through the segments 202, 204, 206 of the model 200, and determine an electronic output. The control module 320 can transmit the electronic output to the device 108 such that the device 108 can use the electronic output to determine events relating to the device 108 such as an event in an environment surrounding the device 108 (e.g., traffic levels and lane closures), and/or a condition of the device 108 (e.g., travel speed).

In one embodiment, the control module 320 includes instructions that, when executed by the processor(s) 310, cause the processor(s) 310 to transmit the model 200 to devices that are capable of processing sensor data 350 using the model 200. As an example, the control module 320 can transmit the model 200 to the device 108 as well as other devices capable of using the model 200 to determine an electronic output. This provides an advantage as the control module 320 does not get overloaded processing sensor data from multiple devices. Instead, the control module sends the model to multiple devices and the devices can individually generate the electronic output based on their sensor data. The control module 320 can transmit the model 200 using any suitable means of communication such as vehicle-to-vehicle (V2V) communication, vehicle-to-infrastructure (V2I) communication, and/or vehicle-to-everything (V2X) communication.

Figure 4:
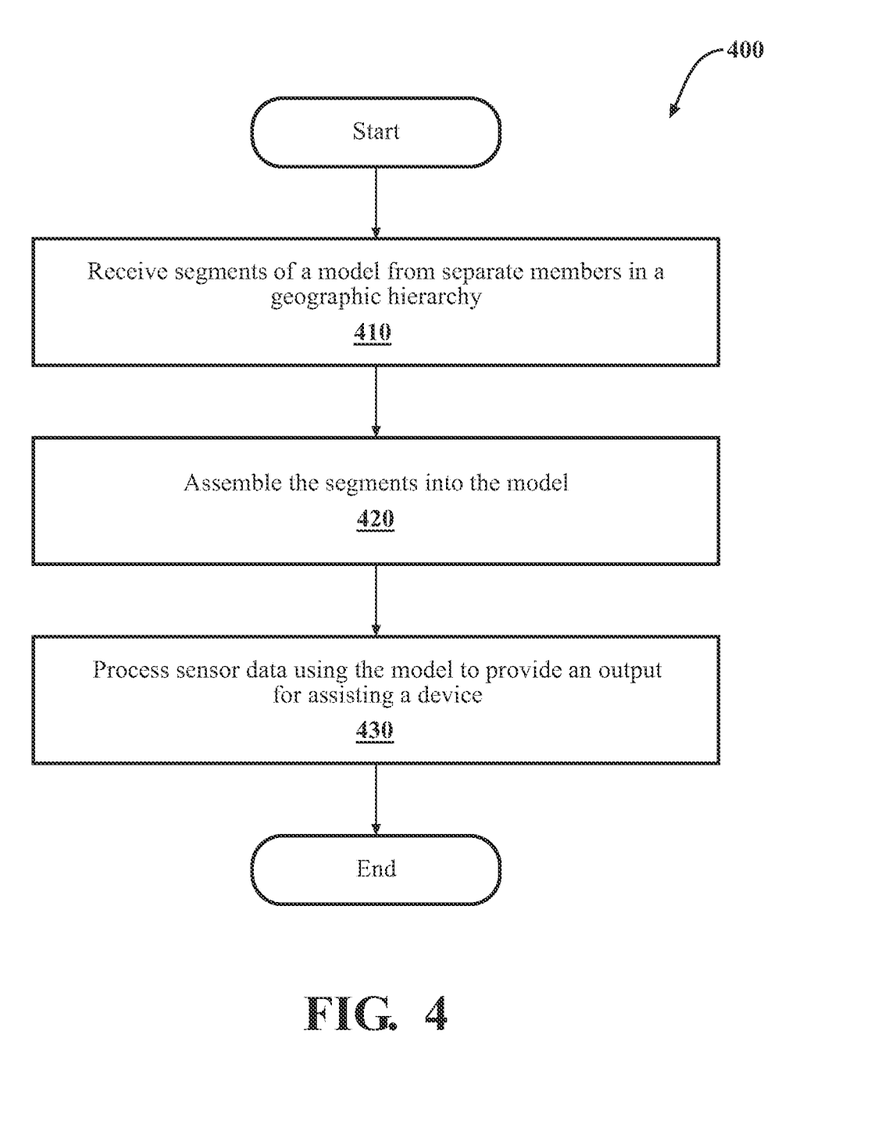
FIG. 4 is a flowchart illustrating one embodiment of a method for achieving transfer learning between devices in different geographical locations.

FIG. 4 illustrates a method 400 for achieving transfer learning between devices in different geographical locations. The method 400 will be described from the viewpoint of the HTL system shown in FIG. 1 and FIG. 3. However, the method 400 may be adapted to be executed in any one of several different situations and not necessarily by the HTL system 100 of FIG. 1 and FIG. 3.

At step 410, the control module 320 receive segments of a model 200 from separate members 102, 104, 106 in a geographic hierarchy. As an example, the control module 320 determine a current location of a device 108, and select the separate members 102, 104, 106 based at least on the current location of the device 108. As an example, the control module 320 request the segments 202, 204, 206 from the separate members 102, 104, 106, and responsive to requesting the segments 202, 204, 206, receive the segments 202, 204, 206.

At step 420, the control module 320 assemble the segments into the model 200. As an example, the segments 202, 204, 206 include at least a first segment 202, a second segment 204, and a third segment 206. In such an example, the first segment 202 can be based at least on an aggregate of trained weights from a plurality of devices within a first region, the second segment 204 can be based at least on an aggregate of trained weights from a plurality of devices within a second region, and the third segment 206 can be based at least on an aggregate of trained weights from a plurality of devices within the third region. Also, in such an example, the second region can be a sub-region of and smaller than the first region, and the third region can be a sub-region of and smaller than the second region. As another example, the first segment 202 can include learning common traffic rules, the second segment 204 can include learning area specific trends, and the third segment 206 can include learning local behaviors, as described above.

At step 430, the control module 320 process sensor data 350 using the model 200 to provide an output for assisting the device 108. As an example, and as previously mentioned, the device 108 can be one of a mobile device and a stationary device. As another example, the control module 320 may transmit the model 200 to devices that are capable of processing sensor data 350 using the model 200.

Figure 5:
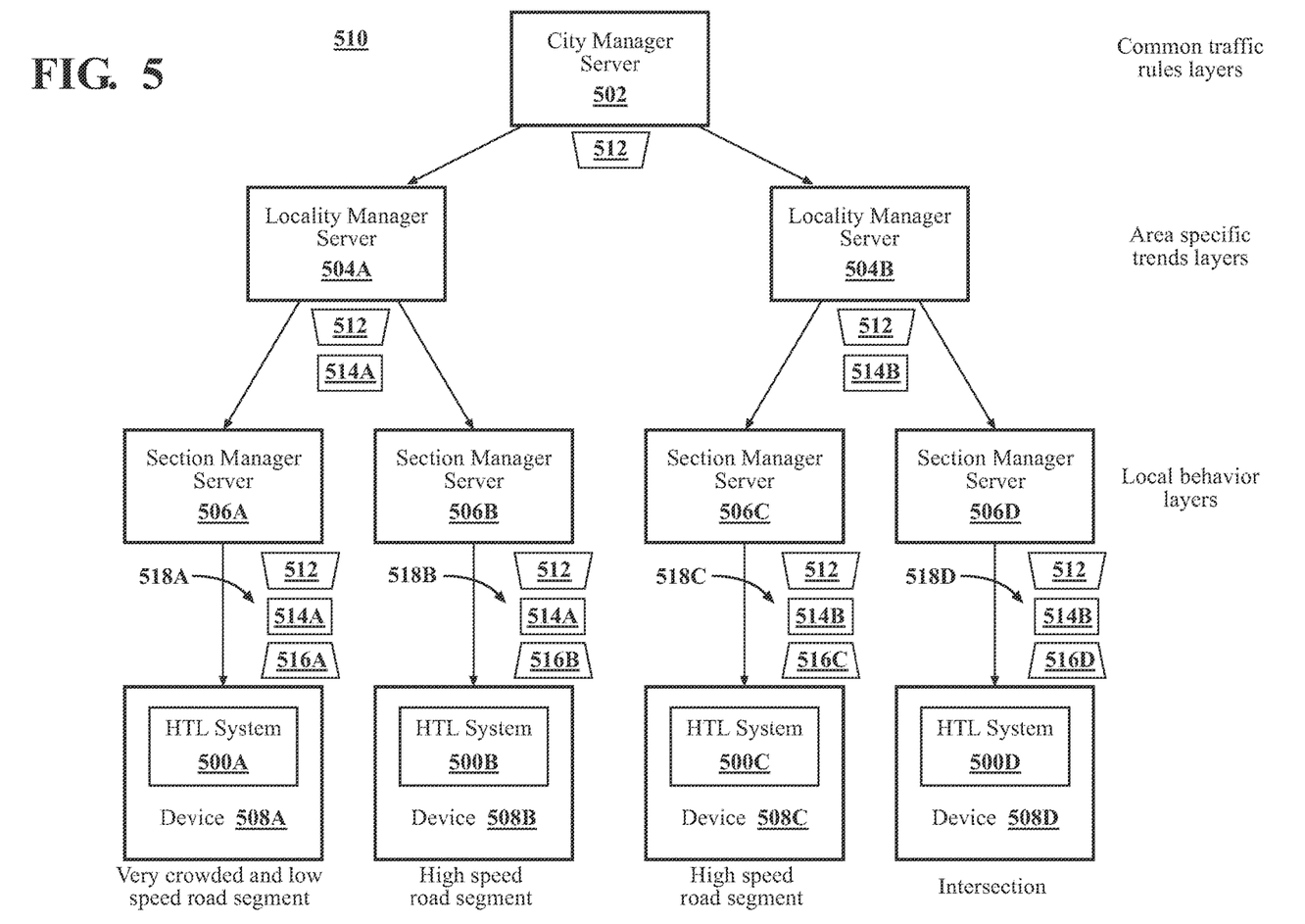
FIG. 5 shows an example of achieving transfer learning between devices in different geographical locations.

A non-limiting example of the operation of the HTL system 100 and/or one or more of the methods will now be described in relation to FIG. 5. FIG. 5 shows an example of achieving transfer learning between devices in different geographical locations.

FIG. 5 shows a geographic hierarchy 510, which is similar to the geographic hierarchy 110 disclosed above. The geographic hierarchy 510 includes one city manager server 502 connected to two locality manager servers (collectively known as 504), a first locality manager server 504A and a second locality manager server 504B. The first locality manager server 504A is connected to two section manager servers 506A, 506B, a first section manager server 506A and a second section manager server 506B. The second locality manager server 504B is connected to two section manager servers 506C, 506D, a third section manager server 506C and a fourth section manager server 506D.

The city manager server 502, the locality manager servers 504, and the section manager servers 506 are located and connected to devices 508, in this case, mobile devices such as vehicles 508A, 508B, 508C, 508D in different locations. The first section manager server 506A is located and connected to vehicles 508A on a first road segment that is very crowded with low-speed traffic. The second section manager server 506B is located and connected to vehicles 508B on a second road segment that has high speed traffic. The third section manager servers 506C is located and connected to vehicles 508C on a third road segment that has high speed traffic. The fourth section manager server 506D is located and connected to vehicles 508D at a fourth road segment that is an intersection. The first locality manager server 504A is connected to vehicles 508A, 508B in the first and second road segments, and the second locality manager server 504B is connected to vehicles 508C, 508D in the third and fourth road segments. The city manager server 502 is connected to vehicles 508A, 508B, 508C, 508D in the first, second, third, and fourth road segments respectively.

Devices in the different locations can learn from available datasets and generate models with three segments. The three segments can include common traffic rules layers, area specific trends layers, and local behavior layers. The devices can transmit the weights relating to the common traffic rules layers to the city manager server 502, the weights relating to the area specific trends layers to the locality manager servers 504, and the weights relating to the local behavior layers to section manager servers 506. The devices 508 receive customized models 518 for training. More specifically, vehicles 508A in the first road segment receive and train using a first model 518A, vehicles 508B in the second road segment can receive and train using a second model 518B, vehicles 508C in the third road segment can receive and train using a third model 518C, and vehicles 508D in the fourth road segment can receive and train using a fourth model 518D.

As an example and in greater detail, upon receiving the weights relating to the common traffic rules layers from the vehicles 508A, 508B, 508C, 508D, the city manager server 502 aggregates the weights into a first segment 512. The city manager server 502 transmits the first segment 512 to the locality manager servers 504A, 504B.

The locality manager servers 504 receive the first segment from the city manager server 502 and weights relating to the area specific trends layers from the vehicles 508. More specifically, the first locality manager server 504A receives weights relating to the area specific trends layers from vehicles 508A, 508B located in the first and second road segments, and the second locality manager server 504B receives weights relating to the area specific trends layers from vehicles 508C, 508D located in the third and fourth road segments. The first locality manager server 504A aggregates the weights into a second segment 514A and transmits the first segment 512 and the second segment 514A based on weights from vehicles 508A, 508B to the section manager servers 506A, 506B. The second locality manager server 504B aggregates the weights into a second segment 514B and transmits the first segment 512 and the second segment 514B based on weights from vehicles 508C, 508D to the section manager servers 506C, 506D.

The section manager servers 506 receive the first and second segments from the locality manager servers 504. The section manager servers 506 receive weights relating to the local behavior layer from the vehicles 508. More specifically, the first section manager server 506A receives first and second segments 512, 514A from the first locality manager server 504A and weights relating to the local behavior layer from vehicles 508A located in the first road segment. The first section manager server 506A aggregates the weights into a third segment 516A. The first section manager server 506A then transmits the first segment 512, the second segment 514A based on weights from vehicles 508A, 508B in the first and second road segments, and the third segment 516A based on weights from vehicles 510A in the first road segment to the HTL system 500A.

The HTL system 500A or more specifically, the control module 320 receives segments of the first model 518A from the first section manager server 506A. The control module 320 assembles the segments into the first model 512A with the common traffic rules layers, the area specific trends layers, and the local behavior layers. The control module 320 processes sensor data from the vehicles 508A in the first road segment using the first model 518A and provides an output for assisting the vehicles 508A in the first road segment. The HTL systems 500B, 500C, 500D operate in a similar fashion to the HTL system 500A, assembling the first segment 512, the second segments 514A, 514B, and the third segments 516B. 516C, 516D into the second, third, and fourth models 518B, 518C, 518D respectively. Further, the control module 320 processes sensor data from the vehicles 508B, 508C, 508D in the respective road segments using the respective models 518B, 518C, 518D and provides an electronic output for assisting the vehicles 508B, 508C, 508D in the respective road segments.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components and/or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A system, comprising:
   one or more processors, and
   a memory communicably coupled to the one or more processors and storing: a control module including instructions that, when executed by the one or more processors cause the one or more processors to:
      receive segments of a model from separate members in a geographic hierarchy;
      assemble the segments into the model, wherein the segments include at least a first segment, a second segment, and a third segment, wherein the first segment includes common traffic rules, the second segment includes area specific trends, and the third segment includes local behaviors, wherein the first segment is based at least on an aggregate of trained weights from a plurality of devices within a first region, the second segment is based at least on an aggregate of trained weights from a plurality of devices within a second region, the third segment is based at least on an aggregate of trained weights from a plurality of devices within a third region, wherein the second region is a sub-region of and smaller than the first region, and wherein the third region is a sub-region of and smaller than the second region; and
      process sensor data using the model to provide an output for assisting a device.

2. The system of claim 1, wherein the control module includes instructions to determine a current location of the device, and select the separate members based at least on the current location of the device.

3. The system of claim 1, wherein the control module includes instructions to request the segments from the separate members, and responsive to requesting the segments, receive the segments.

4. The system of claim 1, wherein the control module includes instructions to transmit the model to one or more devices that are capable of processing sensor data using the model.

5. The system of claim 1, wherein the device is one of a mobile device and a stationary device.

6. A method, comprising:
   receiving segments of a model from separate members in a geographic hierarchy;
   assembling the segments into the model, wherein the segments include at least a first segment, a second segment, and a third segment, wherein the first segment includes common traffic rules, the second segment includes area specific trends, and the third segment includes local behaviors, wherein the first segment is based at least on an aggregate of trained weights from a plurality of devices within a first region, the second segment is based at least on an aggregate of trained weights from a plurality of devices within a second region, the third segment is based at least on an aggregate of trained weights from a plurality of devices within a third region, wherein the second region is a sub-region of and smaller than the first region, and wherein the third region is a sub-region of and smaller than the second region; and
   processing sensor data using the model to provide an output for assisting a device.

7. The method of claim 6, further comprising:
   determining a current location of the device, and
   selecting the separate members based at least on the current location of the device.

8. The method of claim 6, further comprising:
   requesting the segments from the separate members, and
   responsive to requesting the segments, receiving the segments.

9. The method of claim 6, further comprising:
   transmitting the model to one or more devices that are capable of processing sensor data using the model.

10. The method of claim 6, wherein the device is one of a mobile device and a stationary device.

11. A non-transitory computer-readable medium including instructions that, when executed by one or more processors, cause the one or more processors to:
    receive segments of a model from separate members in a geographic hierarchy;
    assemble the segments into the model, wherein the segments include at least a first segment, a second segment, and a third segment, wherein the first segment includes common traffic rules, the second segment includes area specific trends, and the third segment includes local behaviors, wherein the first segment is based at least on an aggregate of trained weights from a plurality of devices within a first region, the second segment is based at least on an aggregate of trained weights from a plurality of devices within a second region, the third segment is based at least on an aggregate of trained weights from a plurality of devices within a third region, wherein the second region is a sub-region of and smaller than the first region, and wherein the third region is a sub-region of and smaller than the second region; and
    process sensor data using the model to provide an output for assisting a device.

12. The non-transitory computer-readable medium of claim 11, wherein the instructions include instructions to determine a current location of the device, and select the separate members based at least on the current location of the device.

13. The non-transitory computer-readable medium of claim 11, wherein the instructions include instructions to request the segments from the separate members, and responsive to requesting the segments, receive the segments.

14. The non-transitory computer-readable medium of claim 11, wherein the instructions include instructions to transmit the model to one or more devices that are capable of processing sensor data using the model.

15. The non-transitory computer-readable medium of claim 11, wherein the device is one of a mobile device and a stationary device.

* * * * *